Jan. 4, 1944.    C. G. MUNTERS ET AL    2,338,452
INSULATION FOR COLD STORAGE ROOMS
Filed July 1, 1942    2 Sheets-Sheet 1

Inventors:
Carl Georg Munters
David Esbjörn Ahlqvist
By Jarvis, Marble
their attorney Jan. 4, 1944. C. G. MUNTERS ET AL 2,338,452
INSULATION FOR COLD STORAGE ROOMS
Filed July 1, 1942 2 Sheets-Sheet 2

Patented Jan. 4, 1944

2,338,452

UNITED STATES PATENT OFFICE 2,338,452

INSULATION FOR COLD-STORAGE ROOMS

Carl Georg Munters, Stocksund, and David Esbjörn Ahlqvist, Angby, Sweden

Application July 1, 1942, Serial No. 449,240
In Sweden June 17, 1941

6 Claims. (Cl. 20—4)

Our invention relates to cold-storage rooms or the like, and more particularly to means for preventing condensation of the moisture of the air in the interior of the insulation of said rooms. It is known to enclose insulating units of parallel foils within casings of a material as tight as possible, said casings being provided with openings on the inside, that is to say toward the cold-storage room proper. The warm air which penetrates into the interior of the insulation at the breathing thereof caused by variations in the temperature or the barometer pressure, therefore has to pass through a comparatively narrow space between the cold wall of the cold-storage room and the insulation units. Hereby the air is cooled down, while any moisture in the same is precipitated in such a degree that condensation of water within the insulation is counteracted. A construction of this type presupposes an effective sealing of the casing about the insulation, so that the warm external air will not find its way through the casing directly into the insulation. It is also known to provide a continuous air circulation through the insulation and the interior of the cold-storage room, through which the moisture of the insulation is transferred into the room. The air has then itself to find its way through the inner spaces of the insulation, which, however, does not give any satisfactory result, or, the insulation is formed from containers provided with certain circulation openings, said containers being sustained in a manner such that concentric air spaces are obtained about the refrigerator on all sides thereof. This construction gives a reliable result, but involves certain difficulties in connection with cold-storage rooms of large dimensions.

The invention has for its object to provide improved means of the class described, which is altogether efficient while being simple and inexpensive at the same time. The invention is particularly intended for comparatively large refrigerating plants, but is not limited to such plants. In plants of this type, the cold-storage room with its insulation is built into a frame of wood, concrete, brickwork or the like, which materials cannot be made so tight as to prevent the external atmospheric air from penetrating into the interior of the insulation. Furthermore, the invention has for an essential object to provide a cold-storage room insulation of the multilayer type functioning properly from the point of view of moisture, said insulation consisting of foils having air channels extending therethrough.

Further objects and advantages of the invention will be apparent from the following description considered in connection with the accompanying drawings, which form a part of this specification, and of which:

Figure 1:
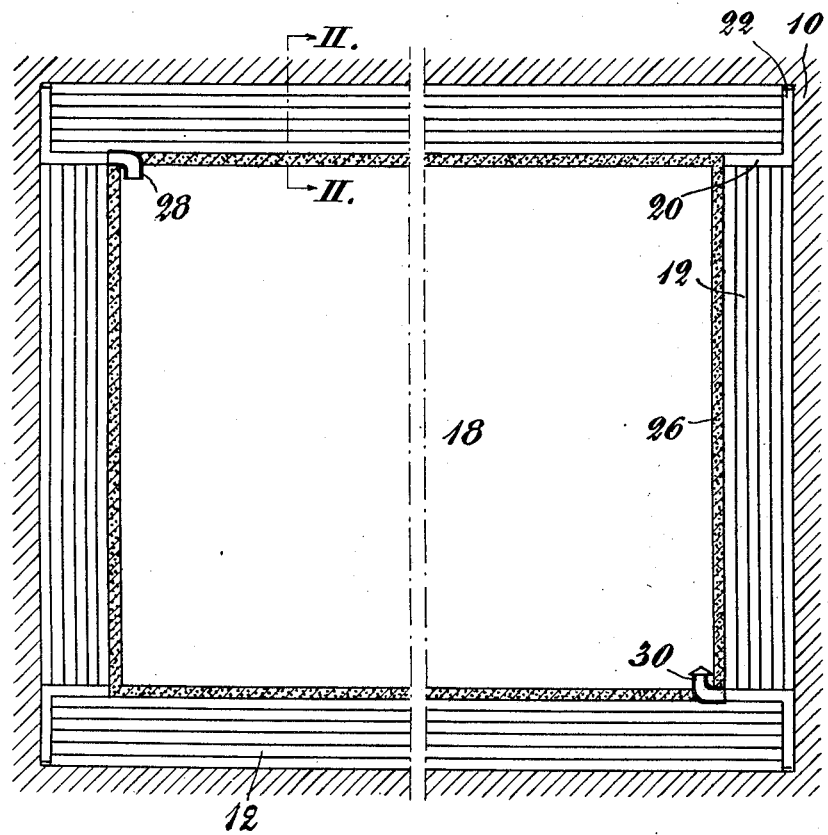
Fig. 1 is a more or less diagrammatic view showing a section through a cold-storage room constructed in accordance with the invention.
Figure 2:
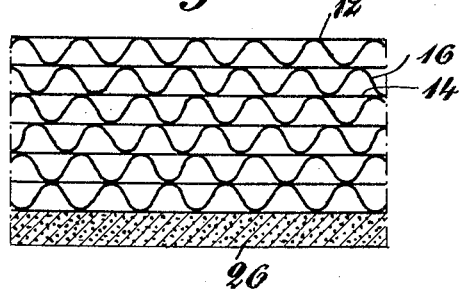
Fig. 2 shows a section on the line II—II to a somewhat enlarged scale.

In the drawings, 10 designates the structural frame of the cold-storage room, said frame being made from wood, concrete, brickwork or the like. Provided on the inner wall of this frame are insulating boards or units 12, which in the illustrated form of embodiment comprise alternating plane and corrugated foils 14 and 16, respectively, which are pasted together, as will appear from Fig. 2. The corrugations of the foil extend so that there are parallel channels extending right through in all parts of the unit. Furthermore, the insulating units are preferably made from paper sheets impregnated by a substance such as bitumen, and of a comparatively great strength. Insulations of this type are described more fully for instance in the copending patent applications No. 386,998 and 396,014 of C. G. Munters. The insulating boards are formed and arranged in a manner such that the channels of the various boards form open passages for the air around the interior 18 of the cold-storage room. The small channels of the boards disposed in the vertical sides of the insulating space thus extend in a vertical direction. In the embodiment shown in Figs. 1 and 2, the boards of the vertical wall portions are spaced from the projecting insulating units of the horizontal wall portions, as indicated at 20. Furthermore, the units or boards of the horizontal wall portions do not extend to the vertical outer wall of the structural frame but terminate at a distance 22 therefrom. Should a plurality of boards be arranged in a row behind one another at a side wall, they may be placed with similar spaces between them. To ensure the position of the boards, they may be pasted onto the outer frame 20 by means of some suitable adhesive.

In the embodiment shown, the insulating boards 12 are covered on the inside by a layer 26 of plaster. Said layer may advantageously be applied directly onto the boards to be carried thereby. The boards have a great rigidity, especially to withstand strains acting in the plane of the vertical board, and are at the same time sufficiently flexible to avoid any tensions tending to loosen or break the plaster.

The interior of the insulation communicates with the interior of the cold-storage room 18 through openings 28 and 30 in the upper and lower portions of the inner wall of said room. Said openings, which may take the form of small pipe sockets, are preferably disposed at two diagonally opposed corners of the wall of the cold-storage room and open into the spaces 20 between the boards of two walls. Provided in the chamber 18 is a cold-generating element or refrigerating plant (not shown). On account of the difference in specific weights between the relatively colder air column in the chamber 18 and the relatively warmer air of the insulation a circulation in a downward direction in the chamber 18 is set up to the opening or openings 30. The air then continues through the lower horizontal board or boards 12, as well as through the vertical boards 12 which are located beside the opening 30, and through the boards communicating therewith up to the opening or openings 28. The moist air in the insulation is then carried to the chamber 18 where the moisture is precipitated. The air which is reintroduced or flows into the insulation is thus comparatively dry. If for some reason or other, for instance at the starting of the refrigerating plant, there would be any water in the insulation, the said air circulation will cause rapid evaporation thereof. The warm air which possibly enters through untight spots of the outer casing 10, is at the same time effectively prevented from giving off its moisture in the insulation when being cooled down in the latter. Therefore, the efficiency of the insulation is maintained constant at a high value even upon a run of very extended duration. Thanks to the open right-through passages for the flow about all of the walls of the chamber 18, it is ensured that all portions of the insulation, and particularly of its horizontal lower portions, where the tendency toward the precipitation of moisture is the greatest, are kept dry in an effective manner.

The height of the channels in the insulation is preferably less than 5 millimeters, whereby the air circulation above described will be kept within limits well balanced, so that the efficiency of the insulation is not reduced through convection losses.

Figure 3:
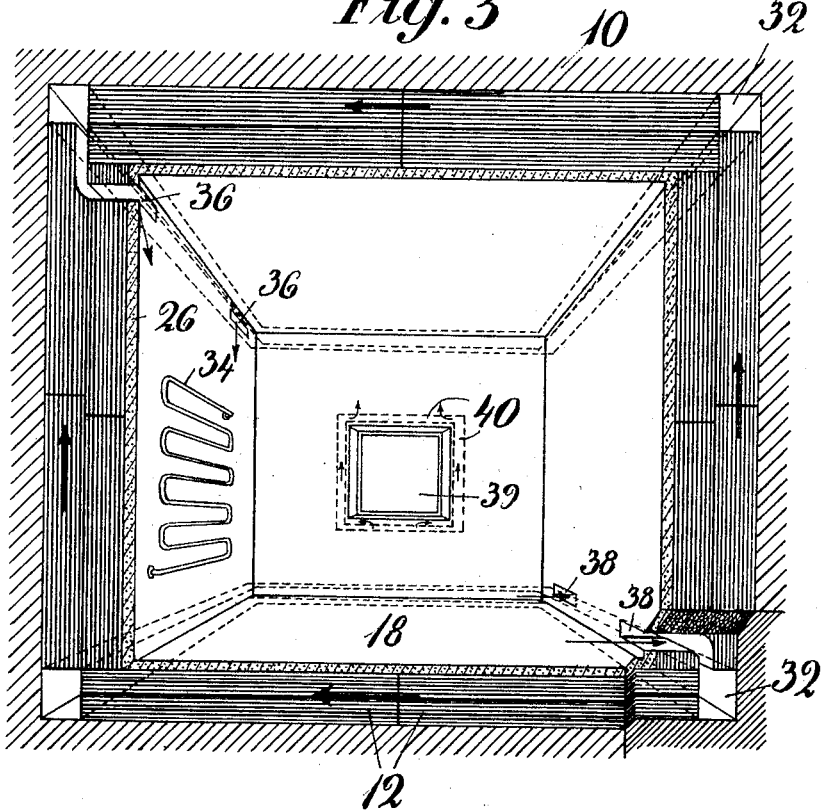
Fig. 3 shows a modified cold-storage room in accordance with the invention in a perspective view with the front wall of the room broken away.

In the embodiment according to Fig. 3, the thickness of the insulating space is illustrated unproportionally great compared with the dimensions of the chamber 18 for the sake of clearness. In the upper and lower corners of the insulating space collecting channels 32 are provided extending round the four sides of the cold-storage room. Said channels have a width being only part of the thickness of the insulating space, wherefore the horizontal units 12 extend a portion over the vertical sides of the insulating space.

An evaporator coil 34 has conduits extending through the insulating space to a refrigerating plant which may be of any known type. The collecting channels 32 in the upper part of the insulating space communicate with the chamber 18 through channels 36 and preferably open therein above the evaporator coil 34. At the bottom of the opposite wall of the chamber 18 from said coil there are openings 38 communicating with the collecting channels 32 in the bottom of the insulating space. Each side of the insulating space may be built up of two or more insulating units or boards 12 laid on each other and moreover such units or boards may be placed in rows after each other. It is essential that the channels of the boards are vertical in the vertical sides of the insulating space and that the bottom and top units are placed so that their channels form continuous passages with said vertical channels through the collecting channels 32.

In the embodiment according to Fig. 3 a flow of air in the direction of the arrows is set up only in the outer portions of the vertical and top sides of the insulating space. Any moist warm air leaking in through the walls 10 is then taken care of by the air flow so that its moisture content is transmitted to the chamber 18. The inner vertical and top units 12 are in this way protected from the moisture. Moreover, a diffusion of any traces of moisture in said units is taking place through the plaster layer 36 to the chamber 18. If the cold-storage room has a window 39 a space may be provided along the frame of the window as at 40 so that a flow of air is set up also in the portions of the units 12 positioned above and below said window, respectively.

An embodiment is conceivable, wherein cooling elements are arranged within the cold-storage room, for instance adjacent the evaporator, the interior of which elements communicates with two places of the insulation on different levels, but which are at the same time separated from the interior of the cold-storage room or only communicate with the latter through exit holes for water of condensation. To ensure the proper mutual positions of the insulating boards, distance pieces may also be made use of.

While several embodiments of the invention have been shown, it is to be understood that these are for purpose of illustration only, and that the invention is not to be limited thereby, but its scope is to be determined by the appended claims viewed in the light of the prior art.

What we claim is:

1. A cold storage room having spaced outer and inner vertical and horizontal walls, insulating material in the spaces between said walls comprising corrugated sheets having channels extending therethrough, the insulating material in the vertical walls being spaced from the insulating material in the horizontal walls at the corners of said room to form collecting ducts, the corrugations in the vertical walls extending in a vertical direction so that the chamber therein communicates with the ducts at the top and bottom thereof, the corrugations in the horizontal walls extending in a horizontal direction so that the channels therein communicate with the ducts at either side thereof, and said inner walls having openings connecting one of the upper and one of the lower ducts with the interior of said room.

2. A cold storage room as defined in claim 1 in which the channels formed by the corrugated sheets have a maximum transverse dimension of less than five millimeters.

3. A cold storage room having spaced outer and inner vertical and horizontal walls, insulating material in the spaces between said walls comprising corrugated sheets having channels extending therethrough, the insulating material in the vertical walls being spaced from the insulating material in the horizontal walls at the corners of said room to form collecting ducts, the corrugations in the vertical walls extending in a vertical direction so that the channels therein communicate with the ducts at the top and bottom thereof, the corrugations in the horizontal walls extending in a horizontal direction so that the channels therein communicate with the ducts at either side thereof, and said inner walls having openings connecting diagonally opposed upper and lower ducts with the interior of the room, the walls bounding the remaining ducts being substantially imperforate.

4. A cold storage room as defined in claim 1 in which said insulating material is secured in fixed relation to the outer walls by means of an adhesive.

5. A cold storage room as defined in claim 1 in which the inner walls are secured to and supported by said insulating material.

6. A cold storage room as defined in claim 1 in which the inner walls comprise plaster applied directly to said insulating material.

CARL GEORG MUNTERS.
DAVID ESBJÖRN AHLQVIST.